United States Patent
Saito et al.

(10) Patent No.: US 9,149,962 B2
(45) Date of Patent: Oct. 6, 2015

(54) TRANSPARENT RESIN SUBSTRATE

(75) Inventors: Masahiro Saito, Fukui (JP); Teppei Itamoto, Fukui (JP)

(73) Assignee: FUKUVI CHEMICAL INDUSTRY CO., LTD., Fukui (JP)

( * ) Notice: Subject to any disclaimer, the term of this patent is extended or adjusted under 35 U.S.C. 154(b) by 33 days.

(21) Appl. No.: 14/352,850

(22) PCT Filed: Oct. 26, 2011

(86) PCT No.: PCT/JP2011/074703
§ 371 (c)(1),
(2), (4) Date: Apr. 18, 2014

(87) PCT Pub. No.: WO2013/061428
PCT Pub. Date: May 2, 2013

(65) Prior Publication Data
US 2014/0248478 A1    Sep. 4, 2014

(51) Int. Cl.
*B32B 27/40* (2006.01)
*B29C 45/14* (2006.01)
*C08J 7/04* (2006.01)

(52) U.S. Cl.
CPC ........... *B29C 45/14811* (2013.01); *C08J 7/042* (2013.01); *C08J 7/045* (2013.01); *B29K 2995/007* (2013.01); *B29K 2995/0026* (2013.01); *B29K 2995/0031* (2013.01); *C08J 2475/16* (2013.01); *C08J 2483/02* (2013.01); *Y10T428/24967* (2015.01); *Y10T 428/249974* (2015.04)

(58) Field of Classification Search
CPC ........ B32B 27/40; B32B 27/30; B32B 27/18; B29C 45/14
USPC .................................... 428/215, 424.2, 424.5
See application file for complete search history.

(56) References Cited

U.S. PATENT DOCUMENTS

| 6,620,493 B2 | 9/2003 | Hasegawa et al. |
| 2001/0031317 A1 | 10/2001 | Hasegawa et al. |
| 2009/0207492 A1 | 8/2009 | Horio et al. |

(Continued)

FOREIGN PATENT DOCUMENTS

| JP | 09-096702 | 4/1997 |
| JP | 10-48001 | 2/1998 |

(Continued)

OTHER PUBLICATIONS

Japan Office action in JP 2013-540551, mail date is Dec. 9, 2014.
Taiwan Office action, mail date is Apr. 28, 2015.

(Continued)

*Primary Examiner* — Alexander Thomas
(74) *Attorney, Agent, or Firm* — Greenblum & Bernstein, P.L.C.

(57) ABSTRACT

The transparent resin substrate has a light-transmitting thermoplastic resin underlying sheet 1 and a hard coating formed on one surface of the underlying sheet, wherein the hard coating includes a resin component obtained by curing an urethane acrylate that contains a tri-functional or less functional urethane acrylate and a tetra-functional or more functional urethane acrylate; a silane coupling agent or a hydrolyzed product thereof, a silica sol having a grain size of 5 to 500 nm and a refractive index in a range of 1.44 to 1.5; and a metal chelate compound. A low refractive index layer is formed on the hard coating, the low refractive index layer includes a low refractive index hollow silica sol having a grain size of 10 to 150 nm and a refractive index of not more than 1.44, the silane coupling agent or the hydrolyzed product thereof, and a metal chelate compound.

6 Claims, 1 Drawing Sheet

(56) References Cited

U.S. PATENT DOCUMENTS

2012/0301635 A1 11/2012 Hasegawa et al.
2014/0168776 A1 6/2014 Saito et al.

FOREIGN PATENT DOCUMENTS

| JP | 2002-221602 | 8/2002 |
| JP | 2006-035778 | 2/2006 |
| JP | 2007-211218 | 8/2007 |
| JP | 2007-229999 | 9/2007 |
| JP | 2009-090523 | 4/2009 |
| JP | 2010-024450 | 2/2010 |
| JP | 2010-064332 | 3/2010 |

OTHER PUBLICATIONS

International Search Report issued Jan. 24, 2012 in PCT/JP2011/074703.

TRANSPARENT RESIN SUBSTRATE

TECHNICAL FIELD

This invention relates to a transparent resin substrate. More specifically, the invention relates to a transparent substrate having a hard coating formed on a transparent thermoplastic resin underlying sheet to provide excellent insert formability as well as excellent shock resistance.

BACKGROUND ART

So far, when a hard coating is to be formed on the surface of a formed body such as injection-formed body, means is usually employed in which a formed body obtained in advance is coated by dipping with a coating solution for forming hard coating followed by curing to form the hard coating. This means is free of problem if the formed body is of a flat shape such as a sheet. If the formed body has a solid shape including dents and protuberances on the surfaces thereof, however, the coating solution cannot be uniformly applied or the liquid cannot be cut well from the formed body arousing such a problem that the thickness of the coated solution becomes uneven giving rise to the formation of striped patterns.

To avoid the above problem, in recent years, there has been employed means (also called insert forming or in-mold forming) according to which a transparent thermoplastic resin sheet forming a hard coating on the surface thereof is used as a substrate for forming, the substrate for forming is placed in a forming metal mold such as for injection forming, the substrate is shaped in a predetermined shape while being heated and, thereafter, a predetermined resin is injected into the metal mold and is cured (patent documents 1 to 3).

PRIOR ART DOCUMENTS

Patent Documents

Patent document 1: JP-A-10-48001
Patent document 2: JP-A-2007-211218
Patent document 3: JP-A-2010-24450

OUTLINE OF THE INVENTION

Problems that the Invention is to Solve

The above means based on the insert forming is capable of preventing the occurrence of inconvenience such as striped patterns caused by unevenness in the thickness of the coated solution accompanied, however, by a problem of cracks that often develop in the hard coating. That is, the hard coating is very harder than a transparent thermoplastic resin sheet that serves as an underlying layer. In preparing a substrate for forming, therefore, the hard coating cannot comply with the flexible thermoplastic resin sheet and is cracked. Further, if a plastic substrate such as of polycarbonate having a hard coating on both surfaces thereof is subjected to the falling ball test, then there occurs such a phenomenon that the substrate is cracked. Namely, this is due to that the hard coating is cracked, first, and then the plastic substrate is cracked.

The above problem becomes more conspicuous if the hard coating is formed on an antireflection film. This is because, like the hard coating, the antireflection film, too, is very harder than the thermoplastic resin sheet.

It is, therefore, an object of the present invention to provide a transparent resin substrate having a hard coating formed on the surface of a transparent thermoplastic resin sheet, effectively preventing the hard coating from being cracked at the time of insert forming and also having property to withstand the falling ball test.

Another object of the present invention is to provide a transparent resin substrate, further, having an antireflection film formed on the hard coating, effectively preventing the hard coating and the antireflection film from being cracked at the time of forming, and also having property to withstand the falling ball test.

Means for Solving the Problems

According to the present invention, there is provided a transparent resin substrate having a light-transmitting thermoplastic resin underlying sheet and a hard coating formed on one surface of the underlying sheet, wherein, the hard coating comprises:

100 parts by weight of a resin component (A) obtained by curing an urethane acrylate that contains a tri-functional or less functional urethane acrylate (A1) and a tetra-functional or more functional urethane acrylate (A2); 1 to 30 parts by weight of a compound (B) represented by the following general formula (1),

$$R_n\text{—Si}(OR_1)_{4-n} \qquad (1)$$

wherein R is an alkyl group or an alkenyl group, $R_1$ is an alkyl group, an alkoxyalkyl group, an acyloxy group or a halogen atom, and n is a number of 1 or 2, or a hydrolyzed product thereof;

1 to 50 parts by weight of a silica sol (C) having a grain size of 5 to 500 nm and a refractive index in a range of 1.44 to 1.5; and 0.1 to 3 parts by weight of a metal chelate compound (D); and wherein, a low refractive index layer is formed on the hard coating, the low refractive index layer comprising a low refractive index hollow silica sol (a) having a grain size of 10 to 150 nm and a refractive index of not more than 1.44, the compound (b) represented by the above general formula (1) or a hydrolyzed product thereof, and a metal chelate compound (c);

the low refractive index layer containing the hollow silica sol (a) in an amount of 10 to 50% by weight, and containing the above compound (b) or the hydrolyzed product thereof and the metal chelate compound (c) at a weight ratio (b/c) of 60/40 to 99/1.

In the transparent resin substrate of the present invention, it is desired that:

(1) The transparent resin underlying sheet comprises an acrylic resin, a polycarbonate resin or a polyethylene terephthalate resin in the surface thereof on the side where the hard coating is formed;

(2) The transparent resin underlying sheet has a thickness of 30 to 1000 μm, the hard coating has a thickness of 0.5 to 10 μm, and the low refractive index layer has a thickness of 50 to 200 nm;

(3) The urethane acrylate in the resin component (A) of the hard coating contains the tri-functional or less functional urethane acrylate (A1) and the tetra-functional or more functional urethane acrylate (A2) at a weight ratio (A1/A2) of 2/98 to 70/30; and (4) An antireflection film of a multi-layer structure is formed on the hard coating, and the uppermost layer of the antireflection film is the low refractive index layer.

The transparent resin substrate is favorably used for insert forming.

Effects of the Invention

The transparent resin substrate of the invention has a hard coating of a specific composition formed on the surface of the underlying sheet of a light-transmitting flexible thermoplastic resin and, at the same time, has a low refractive index layer of a predetermined composition formed on the hard coating. That is, the hard coating and the low refractive index layer much share their components and feature excellent adhesion to each other. Further, the fine granular inorganic oxide contained in the low refractive index layer is a hollow silica sol permitting the low refractive index layer to acquire a relatively high degree of freedom and to easily comply with the underlying sheet at the time of being shaped by heating. Namely, the hard coating is held between the low refractive index layer and the underlying sheet, and closely adheres to both the underlying sheet and the low refractive index layer.

Therefore, the present invention makes it possible to effectively prevent the hard coating and the low refractive index layer from being cracked when the insert forming is conducted by arranging the resin substrate in the forming metal mold or even when the falling ball test is conducted.

By utilizing the above properties of the low refractive index layer, further, the layer of a high refractive index can also be formed between the low refractive index layer and the hard coating to obtain a function of the antireflection film of a multi-layer structure. Even when the antireflection film is formed on the hard coating, the present invention effectively prevents the occurrence of cracking during the insert forming or at the time when the falling ball test is conducted.

MODES FOR CARRYING OUT THE INVENTION

Figure 1:
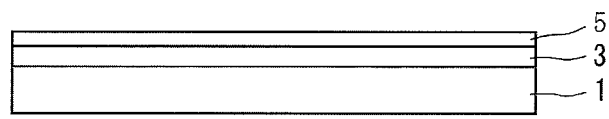
FIG. 1 is a view illustrating a layer constitution of a transparent resin substrate of the present invention.

Referring to FIG. 1, the simplest layer structure of the transparent resin substrate of the invention comprises a light-transmitting thermoplastic resin underlying sheet 1, a hard coating 3 and a low refractive index layer 5.
<Underlying Sheet 1>
The underlying sheet 1 transmits light and comprises a thermoplastic resin having a total light transmission factor at wavelengths of 750 to 400 nm of, for example, not less than 85%. As the thermoplastic resin that transmits light, there can be preferably used acrylic resins as represented by polymethyl methacrylate, as well as polycarbonate resins, polyethylene terephthalate resins, polyallyldiglycol carbonate resins and polystyrene resins.
It is desired that the underlying sheet 1 has a surface that comprises acrylic resin, polycarbonate resin or polyethylene terephthalate resin on the side on where the hard coating 3 is formed. Therefore, a laminate of the polycarbonate resin and the acrylic resin, too, can be preferably used as the underlying sheet 1. Further, the underlying sheet 1 may be tinted with an oil-soluble die so far as the light transmission property is not impaired.

In order to improve close adhesion to the hard coating 3, further, the surface of the underlying sheet 1 may be treated with a primer that has been known per se.

It is, further, desired that the underlying sheet 1 has a thickness which is, usually, small to a suitable degree and, preferably, for example, from 30 to 1000 μm though it may differ depending on the shape and size of the formed body that is finally formed by insert forming. If the thickness is too large, the resin is injected in limited amounts into the forming metal mold at the time of insert forming and it may become difficult to obtain the formed body of a desired shape. If the thickness is too small, on the other hand, the resin substrate 1 for forming cannot be well shaped; i.e., the resin substrate 1 for forming tends to become defective such as being broken at the time of being shaped in the forming metal mold by being heated.
<Hard Coating 3>
The hard coating 3 formed on one surface of the underlying sheet 1 contains a resin component (A) obtained by curing the urethane acrylate, a silane coupling component (B), a silica sol (C) and a metal chelate compound (D).

The hard coating 3 has a thickness of, usually, in a range of 0.5 to 10 μm and, specifically, 1.0 to 5.0 μm though it may vary depending on the thickness of the underlying sheet 1. That is, if the thickness is too small, it becomes difficult to maintain basic properties (e.g., hardness and strength) of the hard coating 3. If the thickness is too large, on the other hand, difference increases in properties (e.g., flexibility and elongation) from the underlying sheet 1. As a result, forming becomes defective such as developing cracking at the time of insert forming.

Described below are the components forming the hard coating 3.
Resin Component (A):
The resin component (A) obtained by curing the urethane acrylate works as a binder for forming film. Here, as the urethane acrylate, use is made of a tri-functional or less functional urethane acrylate (A1) and a tetra-functional or more functional urethane acrylate (A2) in combination. That is, tri-functional or less functional urethane acrylate (A1), upon being cured, forms a portion relatively rich in flexibility while the tetra-functional or more functional urethane acrylate (A2), upon being cured, forms a hard portion. By using them in combination, it is allowed to form a film which is dense to a suitable degree and has a high hardness.

The urethane acrylate is obtained by obtaining a terminal isocyanate compound by reacting a polyvalent isocyanate compound with a polyol compound having a plurality of hydroxyl groups, further, followed by the reaction with a hydroxyl group-containing (meth)acrylate. The (meth)acryloyl group in the urethane acrylate is a functional group. For example, the urethane acrylate is bi-functional if it has two (meth)acryloyl groups, and is tri-functional if it has three (meth)acryloyl groups.

Therefore, the tri-functional or less functional urethane acrylate (A1) is the one having up to three (meth)acryloyl groups at the largest. For example, the urethane acrylate is used as the bi-functional urethane acrylate (A1) if it has a (meth)acryloyl group at each of its both terminals by reacting a pentaerythritol mono(meth)acrylate with a terminal isocyanate compound.

Further, the urethane acrylate is used as the tri-functional urethane acrylate (A1) if it has a (meth)acryloyl group at one terminal of the isocyanate compound and has two (meth)acryloyl groups at the other terminal thereof by reacting with a pentaerythritol mono(meth)acrylate and pentaerythritol di(meth)acrylate to a terminal isocyanate compound.

Further, the urethane acrylate is used as the tetra-functional urethane acrylate (A1) if it has two (meth)acryloyl groups at each of both terminals of the isocyanate compound by reacting the pentaerythritol di(meth)acrylate with the terminal isocyanate compound.

The above are only some of the examples, and any other urethane acrylates can be used so far as they are tri-functional or less functional. For instance, it is allowable to obtain the tri-functional or less functional urethane acrylates (A1) by introducing a desired number of (meth)acryloyl groups by using ethylene glycol, diethylene glycol or a hydroxyl group-containing (meth)acrylic acid ester such as monoester or diester of (meth)acrylic acid of polyhydric alcohol of a valency of 3 or more.

The same holds for the tetra-functional or more functional urethane acrylate (A2), too. For example, by reacting a pentaerythritol tri(meth)acrylate with a both terminal isocyanate (e.g., trihexadiethylene diisocyanate), it is allowed to obtain a hexa-functional urethane acrylate (A2) having three (meth)acryloyl groups at each of the terminals of the molecular chain.

In the invention, it is desired that the above tri-functional or less functional urethane acrylate (A1) and the tetra-functional or more functional urethane acrylate (A2) are used at a weight ratio (A1/A2) of 2/98 to 70/30 and, specifically, 10/90 to 60/40. If the tri-functional or less functional urethane acrylate (A1) is used in too large amounts, the hardness of the obtained hard coating 3 decreases, and basic properties of the hard coating 3 may decrease. If the tetra-functional or more functional urethane acrylate (A2) is used in too large amounts, on the other hand, close adhesion is deteriorated between the hard coating 3 and the resin sheet 1, and the hard coating 3 fails to comply with the resin sheet 1. As a result, cracks tend to occur during the shaping in the forming metal mold based on the insert forming. Besides, the fine granular inorganic oxide (C) that will be described later often tends to split off.

Silane Coupling Component (B)

The silane coupling component (B) is used for holding the silica sol (C) that will be described later dispersed in the hard coating 3 maintaining stability, and for maintaining close adhesion to the underlying sheet 1 or the low refractive index layer 5.

That is, the component (B) is a compound (silane coupling agent) represented by the following general formula (1),

wherein R is an alkyl group or an alkenyl group, $R_1$ is an alkyl group, an alkoxyalkyl group, an acyloxy group or a halogen atom, and n is a number of 1 or 2, or a hydrolyzed product thereof.

As the group R in the above general formula (1), there can be exemplified alkyl groups such as methyl group, ethyl group and propyl group, and alkenyl group such as vinyl group. The alkyl group may be substituted with a halogen atom such as chlorine, or with a functional group such as mercapto group, amino group, (meth)acryloyl group or oxylane ring-containing group.

Further, the group $R_1$ is an alkyl group, alkoxyalkyl group, acyloxy group or halogen atom, and the group $OR_1$ bonded to the silicon atom is hydrolyzable.

Concrete examples of the silane coupling agent include vinyltrichlorosilane, vinyltris(β-methoxyethoxy)silane, vinyltriethoxysilane, vinyltrimethoxysilane, vinyltriacetoxysilane, γ-(meth)acryloxypropyltrimethoxysilane, γ-glycidoxypropyltrimethoxysilane, β-(3,4-epoxycyclohexyl)ethyltrimethoxysilane, γ-glycidoxypropylmethyldiethoxysilane, γ-aminopropyltriethoxysilane, γ-aminopropylmethyldimethoxysilane, N-(8-aminoethyl)-γ-aminopropyltrimethoxysilane, γ-anilinopropyltrimethoxysilane, γ-(N-styrylmethyl-β-aminoethylamino)propyltrimethoxysilane hydrochloride, γ-chloropropyltrimethoxysilane, γ-mercaptopropyltrimethoxysilane, methyltrimethoxysilane, methyltrichlorosilane, and dimethyldichlorosilane.

The hydrolyzed product (B) of the silane coupling agent undergoes the polycondensation simultaneously with the hydrolysis and forms a polymer that is linking like a network due to the Si—O—Si bonding. By using the hydrolyzed product (B) of the silane coupling agent, therefore, it is allowed to densely form the hard coating 3.

In the invention, the content of the above compound or the hydrolyzed product (B) thereof in the hard coating 3 is set to be in a range of 1 to 30 parts by weight and, specifically, 10 to 20 parts by weight per 100 parts by weight of the resin component formed by using the above urethane acrylate. Namely, if the content of the compound or the hydrolyzed product (B) thereof is too large, the hard coating 3 loses its basic properties (hardness, scratch resistance, etc.). If the content thereof is too small, close adhesion is impaired relative to the underlying sheet 1 or the low refractive index layer 5, and the hard coating 3 tends to be easily peeled off.

Silica Sol (C):

The silica sol (C) contained in the hard coating 3 has a grain size of 5 to 500 nm and a refractive index in a range of 1.44 to 1.5. Use of this fine granular oxide makes it possible to uniformly impart basic properties such as hardness and the like to the whole hard coating 3. Unlike the hollow silica sol used for forming the low refractive index layer 5 that is described later, the above silica sol (C) consists of solid particles (having a density of, for example, not less than 1.9) and has a grain size and a refractive index close to those of the hollow silica sol. Therefore, the silica sol (C) works to improve close adhesion to the low refractive index layer 5 that is formed by using the hollow silica sol, effectively prevents the hard coating 3 and the low refractive index layer 5 from cracking at the time of insert forming and, further, makes it possible to form the antireflection film by utilizing the optical properties of the low refractive index layer 5.

The silica sol (C) is used in an amount of 10 to 80 parts by weight and, specifically, 30 to 60 parts by weight per 100 parts by weight of the resin component (A) obtained by using the urethane acrylate. With the silica sol (C) being contained in an amount in such a range in the hard coating 3, it is allowed to improve close adhesion to the low refractive index layer 5 yet maintaining basic properties of the hard coating 3 and to effectively prevent cracking and the like at the time of insert forming.

Metal Chelate Compound (D):

In the invention, the metal chelate compound (D) is used for introducing a crosslinked structure into the hard coating 3 and to form the hard coating 3 more densely. Namely, the resin component (A) obtained by using the urethane acrylate, too, is forming the crosslinked structure but its density is decreasing due to the lowly functional urethane acrylate (A1) that is used for imparting flexibility. That is, the metal chelate compound (D) is used to compensate for a decrease of the density of the hard coating 3 without impairing its flexibility or, in other words, is used for adjusting the mechanical properties such as hardness and the like that are affected by the density of the coating. Further, the metal chelate compound is contained in the low refractive index layer 5, too. Therefore, use of the metal chelate compound (D), further, improves close adhesion between the hard coating 3 and the low refractive index layer 5, and effectively prevents cracking and the like at the time of insert forming.

As the metal chelate compound (D), there can be preferably used titanium, zirconium, aluminum, tin, niobium, tantalum or a lead compound containing a bidentate legand.

The bidentate legand is a chelating agent having coordinations in a number of two, i.e., in which two atoms can be coordinated on a metal. Usually, a 5- to 7-membered ring is formed by O, N or S atoms to form a chelate compound. Examples of the bidentate legand include acetyl acetonato, ethyl acetoacetato, diethyl malonato, dibenzoyl methanato, salicylato, glycolato, catecholato, salicyl aldehydato, oxyacetophenonato, biphenolato, puromechonato, oxynaphtoquinonato, oxyanthraquinonato, topolonato, binokichilato, glycinato, alaninato, anthroninato, picolinato, aminophenolato, ethanol aminato, mercaptoethyl aminato, 8-oxyquinolinato, salicylaldiminato, benzoin oxymato, salicylalkoxymato, oxyazobenzenato, phenylazonaphtholato, β-nitroso-α-naphtholato, diazoaminobenzenato, beuretato, diphenylcarbazonato, diphenylthiocarbazonato, biguanidato, and dimethyl glyoxymato.

The metal chelate compound (D) that is preferably used in the present invention is expressed by the following general formula (2), $$M(Li)_k(X)_{m-k} \qquad (2)$$

wherein M is titanium, zirconium, aluminum, tin, niobium, tantalum or lead,
Li is a bidentate legand,
X is a monovalent group and, preferably, a hydrolyzable group,
m is a valency of the metal M, and
k is a number of not less than 1 but in a range of not exceeding the valence of the metal M.

Among them, preferred examples of the metal N is titanium, zirconium and aluminum, and preferred example of the group X is alkoxy group.

Concrete examples of the metal chelate compound include the following Ti chelate compounds, Zr chelate compounds and Al chelate compounds.

Ti Chelate Compounds:
triethoxy.mono(acetylacetonato)titanium
tri-n-propoxy.mono(acetylacetonato)titanium
tri-1-propoxy.mono(acetylacetonato)titanium
tri-n-butoxy.mono(acetylacetonato)titanium
tri-sec-butoxy.mono(acetylacetonato)titanium
tri-t-butoxy.mono(acetylacetonato)titanium
diethoxy.bis(acetylacetonato)titanium
di-n-propoxy.bis(acetylacetonato)titanium
di-i-propoxy.bis(acetylacetonato)titanium
di-n-butoxy.bis(acetylacetonato)titanium
di-sec-butoxy.bis(acetylacetonato)titanium
di-t-butoxy.bis(acetylacetonato)titanium
monoethoxy.tris(acetylacetonato)titanium
mono-n-propoxy.tris(acetylacetonato)titanium
mono-i-propoxy.tris(acetylacetonato)titanium
mono-n-butoxy.tris(acetylacetonato)titanium
mono-sec-butoxy.tris(acetylacetonato)titanium
mono-t-butoxy.tris(acetylacetonato)titanium
tetrakis(acetylacetonato)titanium
triethoxy.mono(ethylacetoacetato)titanium
tri-n-propoxy.mono(ethylacetoacetato)titanium
tri-i-propoxy.mono(ethylacetoacetato)titanium
tri-n-butoxy.mono(ethylacetoacetato)titanium
tri-sec-butoxy.mono(ethylacetoacetato)titanium
tri-t-butoxy.mono(ethylacetoacetato)titanium
diethoxy.bis(ethylacetoacetato)titanium
di-n-propoxy.bis(ethylacetoacetato)titanium
di-i-propoxy.bis(ethylacetoacetato)titanium
di-n-butoxy.bis(ethylacetoacetato)titanium
di-sec-butoxy.bis(ethylacetoacetato)titanium
di-t-butoxy.bis(ethylacetoacetato)titanium
monoethoxy.tris(ethylacetoacetato)titanium
mono-n-propoxy.tris(ethylacetoacetato)titanium
mono-i-propoxy.tris(ethylacetoacetato)titanium
mono-n-butoxy.tris(ethylacetoacetato)titanium
mono-sec-butoxy.tris(ethylacetoacetato)titanium
mono-t-butoxy.tris(ethylacetoacetato)titanium
tetrakis(ethylacetoacetato)titanium
mono(acetylacetonato)tris(ethylacetoacetato)titanium
bis(acetylacetonato)bis(ethylacetoacetato)titanium
tris(acetylacetonato)mono(ethylacetoacetato)titanium Zr Chelate Compounds:
triethoxy.mono(acetylacetonato)zirconium
tri-n-propoxy.mono(acetylacetonato)zirconium
tri-i-propoxy.mono(acetylacetonato)zirconium
tri-n-butoxy.mono(acetylacetonato)zirconium
tri-sec-butoxy.mono(acetylacetonato)zirconium
tri-t-butoxy.mono(acetylacetonato)zirconium
diethoxy.bis(acetylacetonato)zirconium
di-n-propoxy.bis(acetylacetonato)zirconium
di-i-propoxy.bis(acetylacetonato)zirconium
di-n-butoxy.bis(acetylacetonato)zirconium
di-sec-butoxy.bis(acetylacetonato)zirconium
di-t-butoxy.bis(acetylacetonato)zirconium
monoethoxy.tris(acetylacetonato)zirconium
mono-n-propoxy.tris(acetylacetonato)zirconium
mono-i-propoxy.tris(acetylacetonato)zirconium
mono-n-butoxy.tris(acetylacetonato)zirconium
mono-sec-butoxy.tris(acetylacetonato)zirconium
mono-t-butoxy.tris(acetylacetonato)zirconium
tetrakis(acetylacetonato)zirconium
triethoxy.mono(ethylacetoacetato)zirconium
tri-n-propoxy.mono(ethylacetoacetato)zirconium
tri-i-propoxy.mono(ethylacetoacetato)zirconium
tri-n-butoxy.mono(ethylacetoacetato)zirconium
tri-sec-butoxy.mono(ethylacetoacetato)zirconium
tri-t-butoxy.mono(ethylacetoacetato)zirconium
diethoxy.bis(ethylacetoacetato)zirconium
di-n-propoxy.bis(ethylacetoacetato)zirconium
di-i-propoxy.bis(ethylacetoacetato)zirconium
di-n-butoxy.bis(ethylacetoacetato)zirconium
di-sec-butoxy.bis(ethylacetoacetato)zirconium
di-t-butoxy.bis(ethylacetoacetato)zirconium
monoethoxy.tris(ethylacetoacetato)zirconium
mono-n-propoxy.tris(ethylacetoacetato)zirconium
mono-i-propoxy.tris(ethylacetoacetato)zirconium
mono-n-butoxy.tris(ethylacetoacetato)zirconium
mono-sec-butoxy.tris(ethylacetoacetato)zirconium
mono-t-butoxy.tris(ethylacetoacetato)zirconium
tetrakis(ethylacetoacetato)zirconium
mono(acetylacetonato)tris(ethylacetoacetato)zirconium
bis(acetylacetonato)bis(ethylacetoacetato)zirconium
tris(acetylacetonato)mono(ethylacetoacetato)zirconium Al Chelate Compounds:
diethoxy.mono(actylacetonato)aluminum
monoethoxy.bis(acetylacetonato)aluminum
di-i-propoxy.mono(acetylacetonato)aluminum
mono-i-propoxy.bis(acetylacetonato)aluminum
mono-i-propoxy.bis(ethylacetoacetato)aluminum
monoethoxy.bis(ethylacetoacetato)aluminum
diethoxy.mono(ethylacetoacetato)aluminum
di-i-propoxy.mono(ethylacetoacetato)aluminum The above metal chelate compound (D) is used in an amount of 0.1 to 30 parts by weight and, specifically, 0.5 to 15 parts by weight per 100 parts by weight of the resin component (A) obtained from the urethane acrylate. By using the metal chelate compound (D) in amounts in this range, it is allowed to improve close adhesion to the low refractive index layer 5 formed on the hard coating 3.

<Low Refractive Index Layer 5>

The low refractive index layer 5 formed on the hard coating 3 comprises the hollow silica sol (a), the silane coupling agent or the hydrolyzed product thereof (b) and the metal chelate compound (c). The low refractive index layer 5 that is formed makes it possible to effectively prevent defective forming at the time of insert forming.

The low refractive index layer 5 formed by using the above components has a thickness, usually, in a range of 50 to 200 nm though it may vary depending on the thickness of the hard coating 3. If the thickness is too small, properties such as strength and the like are impaired causing breakage at the time of insert forming. If the thickness is too large, on the other hand, flexibility and the like are greatly deteriorated, and a difference in properties increases from, for example, the underlying sheet 1 causing the forming to become defective, such as developing cracking at the time of insert forming. The low refractive index layer 5 can be, further, utilized as an antireflection film against visible rays if it has a thickness lying within the above range.

Components forming the low refractive index layer 5 will now be described.

Hollow Silica Sol (a):

The hollow silica sol (a) is used for adjusting properties relative to the hard coating 3, and has a grain size of 10 to 150 nm and a refractive index of not more than 1.44. It will, therefore, be learned that the hollow silica sol (a) has a grain size and a refractive index close to those of the silica sol (C) used for forming the hard coating 3. However, the silica sol (a) used for forming the low refractive index layer 5 consists of hollow particles, and has a density lower than that of the silica sol (C), i.e., has a density of not more than 1.5.

Like the above-mentioned silica sol (C), the hollow silica sol (a) consists of fine particles of a low refractive index, and is used for maintaining a predetermined strength and hardness and to impart properties such as scratch resistance without impairing light-transmitting property of the underlying sheet 1.

The hollow silica sol (a) has been known per se., is produced by, for example, synthesizing a silica in the presence of a surfactant that serves as template finally followed by firing to decompose and remove the surfactant. The hollow silica sol (a) has been placed in the market in the form of a sol being dispersed in an organic solvent such as isopropanol or methyl isobutyl ketone.

The hollow silica sol (a) may be contained in the low refractive index layer 5 in an amount of 10 to 50% by weight reckoned as three components of the hollow silica sol (a), the silane coupling agent or the hydrolyzed product thereof (b) and the metal chelate compound (c). Namely, the rest of 90 to 50% by weight is occupied by the total of the silane coupling agent or the hydrolyzed product thereof (b) that will be described later and the metal chelate compound (c).

Silane Coupling Agent or Hydrolyzed Product Thereof (b) and Metal Chelate Compound (c):

In the present invention, the silane coupling agent or the hydrolyzed product thereof (b) used for forming the low refractive index layer 5, is quite the same as the compound (silane coupling agent) or the hydrolyzed product thereof (B) of the general formula (1) used for forming the hard coating 3. In the above-mentioned hard coating 3, the fine granular silica (silica sol (C)) is held by the resin component (A) obtained from the specific urethane acrylate and by the silane coupling agent or the hydrolyzed product thereof (B) that are serving as a binder. In the low refractive index layer 5, on the other hand, the fine granular silica (hollow silica sol (a)) is held by the silane coupling agent or the hydrolyzed product thereof that is serving as a binder.

Namely, in the invention, the low refractive index layer 5 is formed by using the silane coupling agent or the hydrolyzed product thereof that is also used for the formation of the hard coating 3. Therefore, the low refractive index layer 5 is highly closely adhered to the hard coating 3 effectively preventing the defective forming.

Concrete examples of the silane coupling agent or the hydrolyzed product thereof (b) are the same as those exemplified for the compound or the hydrolyzed product thereof of the above general formula (1), i.e., are the same as those exemplified for the silane coupling agent or the hydrolyzed product thereof (B) used for forming the hard coating 3.

Upon introducing the crosslinked structure therein, the metal chelate compound (c) used for forming the low refractive index layer 5 makes the low refractive index layer 5 dense and improves its adhesiveness to the hard coating 3. Namely, the low refractive index layer 5 that is formed without using the metal chelate compound has a decreased density and, therefore, decreased properties such as hardness. Therefore, not only the scratch resistance decreases but also the adhesiveness decreases relative to the hard coating 3 permitting it to be easily peeled off.

Therefore, the metal chelate compound (c), too, is the same compound as the one exemplified for the metal chelate compound (D) used for forming the hard coating 3, and is, desirably, the above-mentioned Ti chelate compound, Zr chelate compound or Al chelate compound and, most desirably, is the compound which is quite the same as the metal chelate compound used for forming the hard coating 3.

In the present invention, the silane coupling agent or the hydrolyzed product thereof (b) and the metal chelate compound (c) are used at a weight ratio (b/c) of 60/40 to 99/1 from the standpoint of obtaining a suitable degree of density without unnecessarily reinforcing properties such as hardness and the like. If the amount of this compound or the hydrolyzed product thereof (b) (i.e., binder) is small, it becomes difficult to stably hold the hollow silica sol (a). Namely, the silica sol (a) easily splits off during the forming and, besides, close adhesion to the hard coating 3 is impaired permitting the low refractive index layer 5 to easily peel off. If the amount of this compound or the hydrolyzed product thereof (b) is too large, on the other hand, the amount of the metal chelate compound (c) becomes small and, as a result, the density of the low refractive index layer 5 becomes low, adhesiveness to the hard coating 3 decreases, and the low refractive index layer 5 tends to be easily peeled off.

<Other Layer Structures>

As shown in FIG. 1, the transparent resin substrate of the present invention has the hard coating 3 of a specific composition formed on the transparent underlying sheet 1, and the above-mentioned low refractive index layer 5 formed on the hard coating 3, making it possible to effectively prevent the defective forming at the time of insert forming. The layer structure, however, is not limited to the embodiment shown in FIG. 1. That is, the low refractive index layer 5 can be formed as part of the layers of an antireflection film that is formed on the hard coating 3.

Figure 2:
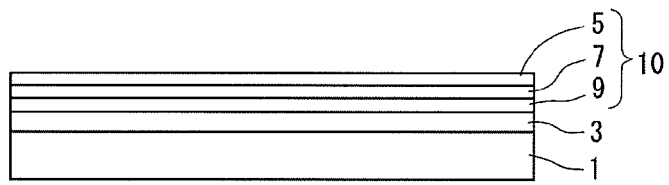
FIG. 2 is a view illustrating a preferred layer constitution of the transparent resin substrate of the present invention.

As shown in FIG. 2, for example, an antireflection film 10 of a multi-layer structure can be formed on the hard coating 3 that is formed on the underlying sheet 1, and one of the layers in the antireflection film 10 is the above-mentioned low refractive index layer 5.

Namely, in the example of FIG. 2, the uppermost layer in the antireflection film 10 is the low refractive index layer 5 having a refractive index adjusted by using the hollow silica sol (a) to be not more than 1.44, and a high refractive index layer 7 of a refractive index of not less than 1.6 is formed thereunder. Further, an intermediate refractive index layer 9 is formed between the high refractive index layer 7 and the hard coating 3, the intermediate refractive index layer 9 having a refractive index that is adjusted to lie between that of the low refractive index layer 5 and that of the high refractive index layer 7. The antireflection is realized by the above three layers.

In the above antireflection film 10, the low refractive index layer 5 has the composition and thickness as described above. The high refractive index layer 7 having a refractive index of not less than 1.6 and the intermediate refractive index layer 9 having an intermediate refractive index (usually, 1.50 to 1.7), too, have nearly the same thicknesses as the low refractive index layer 3 and, concretely, have thicknesses of from 50 to 200 nm.

The high refractive index layer 7 and the intermediate refractive index layer 9 contain a colloidal metal oxide (metal oxide sol) to maintain a predetermined refractive index (i.e., a refractive index higher than that of the low refractive index layer 5), and may, further, be blended with a silane coupling agent or a hydrolyzed product thereof as a binder component for binding and fixing the fine granular metal oxide, and with a metal alkoxide for forming a metal oxide, and a metal chelate compound for forming the hard coating and the low refractive index layer.

As the colloidal metal oxide (metal oxide sol), there can be exemplified titanium oxide sol, alumina sol, zirconium oxide sol and antimony oxide sol. By taking into consideration the adjustment of the refractive index, dispersion in the organic solvent, stability of the coating solution and close adhesion to the plastic substrate, however, it is desired to use the titanium oxide (titania) sol of the rutile type and the zirconium oxide sol.

As the silane coupling agent or the hydrolyzed product thereof, there can be exemplified the silane coupling agent or the hydrolyzed product thereof of the above-mentioned formula (1) as well as, from the standpoint of close adhesion to other layers and excellent resistance against the solvent, an epoxysilane type coupling agent represented by the following formula (2), $$Ep-CH-CH_2-O-R-Si(OR^1)_3 \quad (2)$$

wherein Ep is an epoxy group, R is an alkylene group, and $R^1$ is an alkyl group or an alkoxyalkyl group, or a hydrolyzed product thereof, such as γ-glycidoxypropyl trimethoxysilane or a hydrolyzed product thereof.

As the metal alkoxide, there is preferably used the one represented by the following formula (3), $$M(OR)_m \quad (3)$$

wherein M is a trivalent or tetravalent metal, R is a hydrocarbon group having 1 to 5 carbon atoms, and m is a valence (3 or 4) of the metal M, such as titanium, aluminum, zirconium and alkoxide of tin.

Concretely, there can be exemplified titanium methoxide, titanium ethoxide, titanium n-propoxide, titanium isopropoxide, titanium n-butoxide, titanium isobutoxide, aluminum ethoxide, aluminum isopropoxide, aluminum butoxide, aluminum t-butoxide, tin t-butoxide, zirconium ethoxide, zirconium n-propoxide, zirconium isopropoxide and zirconium n-butoxide.

As the metal chelate compound, there can be preferably used those that were used for forming the hard coating 3 and the low refractive index layer 5.

Further, the high refractive index layer 7 and the intermediate refractive index layer 9 (specifically, the high refractive index layer 9) can contain a metal halide to increase the refractive index.

As the metal halide, there can be used a metal chloride and a metal bromide. More concretely, there can be used antimony trichloride, zirconium tetrachloride, bismuth trichloride, titanium tetrabromide, germanium tetrachloride, antimony tribromide and tantalum pentachloride. From the standpoint of attaining high refractive index, dispersion in the organic solvent and stability of the coating solution, however, it is desired to use the antimony trichloride, bismuth trichloride and antimony tribromide.

Further, the high refractive index layer 7 and the intermediate refractive index layer 9 can contain a suitable thermosetting resin as a binder. As the thermosetting resin, there can be used phenol-formaldehyde resin, furan-formaldehyde resin, xylene-formaldehyde resin, ketone-formaldehyde resin, urea-formaldehyde resin, melamine-formaldehyde resin, alkyd resin, unsaturated polyester resin, epoxy resin, bismaleimide resin, triallyl cyanulate resin, thermosetting acrylic resin, silicone resin, and urethane resin. These resins are used either in one kind or in a combination of two or more kinds.

In the invention, the ratios of the components forming the high refractive index layer 7 and the intermediate refractive index layer 9 are so set as to maintain predetermined refractive indexes, and representative examples are as described below.

(The intermediate refractive index layer 9 may often be omitted).

| Composition of the high refractive index layer 7: | |
|---|---|
| Metal oxide sol: | 30 to 90% by weight, |
| Hydrolyzed silane coupling agent: | 10 to 50% by weight, |
| Metal alkoxide or metal chelate compound: | 1 to 15% by weight, |
| Thermosetting resin: | 20% by weight or less. |
| Composition of the intermediate refractive index layer 9: | |
| Metal oxide sol: | 10 to 60% by weight, |
| Hydrolyzed silane coupling agent: | 10 to 50% by weight, |
| Metal alkoxide or metal chelate compound: | 0.5 to 10% by weight, |
| Thermosetting resin: | 40% by weight or less. |

<Production of the Transparent Resin Substrate>

In the invention, the transparent resin substrate of the above-mentioned structure is produced by, first, preparing the underlying sheet 1 of a predetermined thickness by such means as extrusion forming, and forming the hard coating 3 and the low refractive index layer 5 (or the antireflection film 10) thereon successively.

To form the hard coating 3 and the low refractive index layer 5 (or the antireflection film 10), coating solutions are formed by mixing the components in predetermined solvents in a manner that the above-mentioned composition ratios are obtained, and applying the coating solutions in predetermined thicknesses, followed by curing.

As the organic solvents for preparing the coating solutions, use is made of those that are compatible with the metal oxide gels and the binders. Namely, there are used alcohols such as methanol and isopropanol, ketones such as methyl ethyl ketone and methyl isobutyl ketone, esters such as isobutyl acetate and the like, and aromatic hydrocarbons such as toluene and the like. Specifically, the silica sol and the titanium oxide sol have been placed in the market and used in the form of being dispersed in an alcohol solvent. Therefore, the alcohol solvent is particularly desired. The coating solutions prepared by using these solvents have solid component concentrations of, usually, 0.1 to 50% by weight from the standpoint of applicability.

To cure the resin components, further, the coating solutions are blended with radical polymerization initiator. As the radical polymerization initiator there can be exemplified organic peroxide such as ketone peroxide, peroxyketanol, hydroperoxide, dialkyl peroxide, diacyl peroxide, peroxydicarbonate or peroxy ester. Further, the underlying sheet 1 can be cured by photo polymerization to prevent it from thermally deforming. In this case, a photo polymerization initiator can be added thereto. Examples of the photo polymerization initiator include, though not limited thereto only, 2,2-dimethoxy-2-phenylacetophenone, acetophenone, benzophenone, xanthone, 3-methylacetophenone, 4-chlorobenzophenone, 4,4'-dimethoxybenzophenone, N,N,N',N'-tetramethyl-4,4'-diaminobenzophenone, benzoisopropyl ether, benzyldimethylketal, 1-(4-isopropylphenyl)-2-hydroxy-2-methylpropane-1-one, etc.

To promote the hydrolysis of the silane coupling agent and the metal alkoxide, further, the coating solutions can be added with an aqueous solution of acid such as of hydrochloric acid, sulfuric acid, nitric acid or acetic acid.

The above radical polymerization initiator and the aqueous solution of acid can be added, respectively, in known amounts to the coating solutions.

The coating solutions can be applied, preferably, by a dipping method to easily form thin films. Thin films of the applied coating solutions are heat-treated at temperatures of, usually, about 70 to about 140° C. and are, further, suitably irradiated with light so as to be cured to thereby form hard coating 3, low refractive index layer 5 or antireflection film 10 (intermediate refractive index layer 9, high refractive index layer 7 and low refractive index layer 5), successively.

The thus formed transparent resin substrate is arranged, for example, in a predetermined forming metal mold, and is shaped to meet the mold surfaces while being heated. Thereafter, a predetermined resin is injected and is cured to obtain a formed body of a predetermined shape having the hard coating (and antireflection film) formed on the surface thereof.

The resin that is injected is a transparent thermoplastic resin that can favorably melt-adhere to the underlying sheet 1, such as polycarbonate resin or acrylic resin.

The transparent resin substrate of the present invention is effective in preventing the hard coating and the antireflection film from cracking at the time of insert forming, in avoiding a decrease in the yield caused by defective forming, and in maintaining high productivity.

The transparent resin substrate for insert forming can be used for forming whole-surface panels for the optical display surfaces such as of CRT, LCD and plasma displays.

EXAMPLES

Excellent effects of the invention will now be described by the following Experimental Examples.

In the following Experimental Examples, measurements were taken by the following methods.

(1) Total Light Transmission Factor.

By using V-550+integrating sphere manufactured by Nihon Bunko Co., a maximum transmission factor was measured at a scanning rate of 1000 nm/min., at wavelengths over a range of 780 to 380 nm and was regarded to be the total light transmission factor.

(2) Reflectivity.

By using the same testing machine as the one for measuring the total light transmission factor and under the same conditions, the reflectivity was measured at the lowermost point (substrate surface).

(3) Elongation Percentage.

The antireflection film (inclusive of hard coating) was applied onto one surface of a 0.5-mm substrate, heated at a temperature at which the substrate was softened for about 30 seconds, and was bent by using a 90°-bending jig with R. The elongation percentage was calculated from the R-value of when no cracking occurred.

(4) Hardness.

Hardness was measured by using a hardness meter C-2210 manufactured by Yoshimitsu Seiki Co. and by using a pencil (Uni produced by Mitsubishi Empitsu Co.). The hardness is expressed by the pencil hardness. The higher the hardness, the better the scratch resistance.

(5) Scratch Resistance.

A steel wool (BONSTER No. 0000 manufactured by Nihon Steel Wool Co.) was moved round trip 20 times on the surface of a sample while applying a pressure of 500 g/cm$^2$, and the occurrence of scratch was judged with the eye to evaluate the scratch resistance. The judgment was on the following basis. In the test, the transmitted light stands for light that has passed through the transparent resin substrate and the reflected light stands for light reflected by the surface of the transparent resin substrate.

⊚: No scratch was confirmed from the observation of either the transmitted light or the reflected light.

○: Several scratches were confirmed from the observation of the transmitted light but were not confirmed from the reflected light.

Δ: Several scratches were confirmed from the observation of either the transmitted light or the reflected light.

x: Ten or more scratches were confirmed from the observation of either the transmitted light or the reflected light.

(6) Thermal Shaping.

Occurrence of cracks was observed at the time of effecting the thermal shaping by effecting the heating at 115° C. for 60 seconds prior to the forming.

⊚: Could be thermally shaped without any crack.

x: Cracks occurred.

(7) Falling Ball Test.

The transparent resin substrates obtained in Examples and Comparative Examples were cut into squares of 100 mm, and were placed on a 100-mm square support plate having at the center thereof a hole of φ50 and a depth of 10 mm. A steel ball weighing 130 g was fallen on the center of the substrate from a height of 200 mm to evaluate if the substrate was cracked.

⊚: Substrate was not cracked.

x: Substrate was cracked.

Example 1

A polycarbonate/polymethyl methacrylate laminated sheet was prepared as the underlying sheet. The specifications of the underlying sheet were as follows:

Underlying Sheet:

Thickness: 500 μm (PC: 440 μm, PMMA: 60 μm)

Side surface forming the hard coating: polymethyl methacrylate

Total light transmission factor: 91%

A coating solution for hard coating was prepared according to the following recipe (see Table 1). Parentheses show the composition per 100 parts by weight of the urethane acrylate (A).

The methylisobutyl ketone and the isopropanol were used as the organic solvent. The amount of the organic solvent in the following recipe was inclusive of the amount of the isopropanol in the dispersion medium used for the silica sol.

Recipe of the Coating Solution for Forming the Hard Coating:

| | |
|---|---|
| (A1) Aliphatic organic isocyanate type bifunctional acrylate (hereinafter AfOI2FA) | 7.5 g (5 parts by weight) |
| (A2) Aliphatic organic isocyanate type tetrafunctional acrylate (hereinafter AfOI4FA) | 42.5 g (95 parts by weight) |
| (A3) γ-Glycidoxypropyltrimethoxysilane (hereinafter GPTMS) | 30.0 g (20 parts by weight) |
| (C) Solid silica sol of a grain size of 10 nm (hereinafter 10-nm SSS) (refractive index, 1.48) | 60.0 g (40 parts by weight) |
| (D) Zirconium dibutoxybis (ethylacetoacetate) (hereinafter ZDBB(EAA)) | 1.5 g (1 part by weight) |
| Organic solvent | 746.7 g |
| Aqueous solution of acetic acid | 6.9 g |
| Photo polymerization initiator | 4.9 g |

The above solution for forming the hard coating was applied onto the surface of the underlying sheet 1, and was heated and irradiated with ultraviolet ray to form a hard coating of a thickness of 2 μm.

Next, the coating solution for forming the low refractive index layer was prepared according to the following recipe (see Table 1). Parentheses show the composition of the low refractive index layer.

The amounts of sols such as silica sol are all the amounts of the solid components (e.g., exclusive of the solvent).

Further, the methylisobutyl ketone was used as the organic solvent. The amount of the organic solvent in the following recipe was inclusive of the amount of the isopropanol in the dispersion medium used for the silica sol.

Recipe of the Coating Solution for Forming the Low Refractive Index Layer:

| | |
|---|---|
| (a) Hollow silica sol of a grain size of 60 nm (hereinafter 60-nm HSS) (refractive index, 1.25) | 14.0 g (50 parts by weight) |
| (b) GPTMS | 8.4 g (30 parts by weight) |
| (c) ZDBB (EAA) | 5.6 g (20 parts by weight) |
| Organic solvent | 970.1 g |
| Aqueous solution of acetic acid | 1.9 g |

The above coating solution for forming the low refractive index layer was applied onto the above hard coating, and was heated to form the low refractive index layer thereby to obtain a transparent resin substrate for insert forming. The low refractive index layer possessed a thickness of 100 nm and a refractive index of 1.38.

The transparent resin substrate for insert forming was evaluated for its total light transmission factor, reflectivity, elongation percentage, hardness, scratch resistance and heat-shapability by the above-mentioned methods to obtain the results as shown in Table 3.

Example 2

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.49 and the low refractive index layer possessed a refractive index of 1.4.

Recipe of the Coating Solution for Forming the Hard Coating:

| | |
|---|---|
| (A1) AfOI2FA | 105.0 g (70 parts by weight) |
| (A2) AfOI4FA | 45.0 g (30 parts by weight) |
| (B) 3-Acryloxypropyltrimethoxysilane (hereinafter APTMS) | 30.0 g (20 parts by weight) |
| (C) Solid silica sol of a grain size of 12 nm (hereinafter 12-nm SSS) (refractive index, 1.48) | 60.0 g (40 parts by weight) |
| (D) Alkylacetoacetatealuminum diisopropylate (hereinafter AAAADI) | 1.5 g (1 part by weight) |
| Organic solvent | 746.7 g |
| Aqueous solution of acetic acid | 6.9 g |
| Photo polymerization initiator | 4.9 g |

Recipe of the Coating Solution for Forming the Low Refractive Index Layer:

| | |
|---|---|
| (a) Hollow silica sol of a grain size of 50 nm (hereinafter 50-nm HSS) (refractive index, 1.3) | 14.0 g (50 parts by weight) |
| (b) APTMS | 8.4 g (30 parts by weight) |
| (c) AAAADI | 5.6 g (20 parts by weight) |
| Organic solvent | 970.1 g |
| Aqueous solution of acetic acid | 1.9 g |

The above transparent resin substrate for insert forming was evaluated for its properties in the same manner as in Example 1 to obtain the results as shown in Table 3.

Example 3

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.5 and the low refractive index layer possessed a refractive index of 1.38.

Recipe of the Coating Solution for Forming the Hard Coating:

| | |
|---|---|
| (A1) AfOI2FA | 45.0 g (30 parts by weight) |
| (A2) AfOI4FA | 105.0 g (70 parts by weight) |
| (B) gPTMS | 37.5 g (25 parts by weight) |
| (C) 10-nm SSS | 1.5 g (1 part by weight) |
| (D) Aluminum trisacetyl acetonate (hereinafter ATAA) | 1.5 g (1 part by weight) |
| Organic solvent | 796.0 g |
| Aqueous solution of acetic acid | 8.6 g |
| Photo polymerization initiator | 4.9 g |

Recipe of the Coating Solution for Forming the Low Refractive Index Layer:

| | |
|---|---|
| (a) 60-nm HSS | 14.0 g (50 parts by weight) |
| (b) GPTMS | 13.86 g (49.5 parts by weight) |
| (c) ATAA | 0.14 g (0.5 parts by weight) |
| Organic solvent | 968.8 g |
| Aqueous solution of acetic acid | 3.2 g |

The above transparent resin substrate for insert forming was evaluated for its properties in the same manner as in Example 1 to obtain the results as shown in Table 3.

Example 4

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.49 and the low refractive index layer possessed a refractive index of 1.4.

Recipe of the Coating Solution for Forming the Hard Coating:

| | |
|---|---|
| (A1) Alicyclic organic isocyanate-type trifunctional acrylate (hereinafter AcOI3FA) | 45.0 g (30 parts by weight) |
| (A2) Alicyclic organic isocyanate-type tetrafunctional acrylate (hereinafter AcOI4FA) | 105.0 g (70 parts by weight) |
| (B) GPTMS | 1.5 g (1 part by weight) |
| (C) 10-nm SSS | 67.5 g (45 parts by weight) |
| (D) Zirconium tetraacetyl acetonate (hereinafter ZTAA) | 1.5 g (1 part by weight) |
| Organic solvent | 774.2 g |
| Aqueous solution of acetic acid | 0.4 g |
| Photo polymerization initiator | 4.9 g |

Recipe of the Coating Solution for Forming the Low Refractive Index Layer:

| | |
|---|---|
| (a) 50-nm HSS | 14.0 g (50 parts by weight) |
| (b) GPTMS | 13.86 g (49.5 parts by weight) |
| (c) ZTAA | 0.14 g (0.5 parts by weight) |
| Organic solvent | 968.8 g |
| Aqueous solution of acetic acid | 3.2 g |

The above transparent resin substrate for insert forming was evaluated for its properties in the same manner as in Example 1 to obtain the results as shown in Table 3.

Example 5

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.49 and the low refractive index layer possessed a refractive index of 1.38.

Recipe of the Coating Solution for Forming the Hard Coating:

| | |
|---|---|
| (A1) AcOI3FA | 45.0 g (30 parts by weight) |
| (A2) AcOI4FA | 105.0 g (70 parts by weight) |
| (B) GPTMS | 37.5 g (25 parts by weight) |
| (C) 10-nm SSS | 67.5 g (45 parts by weight) |
| (D) ZTAA | 1.5 g (1 part by weight) |
| Organic solvent | 730.0 g |
| Aqueous solution of acetic acid | 8.6 g |
| Photo polymerization initiator | 4.9 g |

Recipe of the Coating Solution for Forming the Low Refractive Index Layer:

| | |
|---|---|
| (a) 60-nm HSS | 14.0 g (50 parts by weight) |
| (b) GPTMS | 13.86 g (49.5 parts by weight) |
| (c) ZTAA | 0.14 g (0.5 parts by weight) |
| Organic solvent | 968.8 g |
| Aqueous solution of acetic acid | 3.2 g |

The above transparent resin substrate for insert forming was evaluated for its properties in the same manner as in Example 1 to obtain the results as shown in Table 3.

Example 6

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.49 and the low refractive index layer possessed a refractive index of 1.46.

Recipe of the Coating Solution for Forming the Hard Coating:

| | |
|---|---|
| (A1) AfOI2FA | 45.0 g (30 parts by weight) |
| (A2) Aliphatic organic isocyanate-type hexafunctional acrylate (hereinafter AfOI6FA) | 105.0 g (70 parts by weight) |
| (B) 2-(3,4-Epoxycyclohexyl) ethyltrimethoxysilane (hereinafter (ECH)ETMS) | 30.0 g (20 parts by weight) |
| (C) 10-nm SSS | 60.0 g (40 parts by weight) |
| (D) ZDBB(EAA) | 0.15 g (0.1 part by weight) |
| Organic solvent | 748.05 g |
| Aqueous solution of acetic acid | 6.9 g |
| Photo polymerization initiator | 4.9 g |

Recipe of the Coating Solution for Forming the Low Refractive Index Layer:

| | |
|---|---|
| (a) 60-nm HSS | 2.8 g (10 parts by weight) |
| (b) (ECH)ETMS | 15.4 g (55 parts by weight) |
| (c) ZDBB(EAA) | 9.8 g (35 parts by weight) |
| Organic solvent | 968.5 g |
| Aqueous solution of acetic acid | 3.5 g |

The above transparent resin substrate for insert forming was evaluated for its properties in the same manner as in Example 1 to obtain the results as shown in Table 3.

Example 7

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.49 and the low refractive index layer possessed a refractive index of 1.47.

Recipe of the Coating Solution for Forming the Hard Coating:

| | |
|---|---|
| (A1) AfOI2FA | 45.0 g (30 parts by weight) |
| (A2) AfOI6FA | 105.0 g (70 parts by weight) |
| (B) GPTMS | 30.0 g (20 parts by weight) |
| (C) 12-nm SSS | 60.0 g (40 parts by weight) |
| (D) ZDBB(EAA) | 4.5 g (3 parts by weight) |
| Organic solvent | 743.7 g |
| Aqueous solution of acetic acid | 6.9 g |
| Photo polymerization initiator | 4.9 g |

Recipe of the Coating Solution for Forming the Low Refractive Index Layer:

| | |
|---|---|
| (a) 50-nm HSS | 2.8 g (10 parts by weight) |
| (b) gPTMS | 24.92 g (89 parts by weight) |
| (c) ZDBB(EAA) | 0.28 g (1 part by weight) |
| Organic solvent | 966.3 g |
| Aqueous solution of acetic acid | 5.7 g |

The above transparent resin substrate for insert forming was evaluated for its properties in the same manner as in Example 1 to obtain the results as shown in Table 3.

Example 8

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.49 and the low refractive index layer possessed a refractive index of 1.38.

Recipe of the Coating Solution for Forming the Hard Coating:

| | |
|---|---|
| (A1) AfOI2FA | 15.0 g (10 parts by weight) |
| (A2) AfOI4FA | 135.0 g (90 parts by weight) |
| (B) GPTMS | 30.0 g (20 parts by weight) |
| (C) 10-nm SSS | 60.0 g (40 parts by weight) |
| (D) ZDBB(EAA) | 1.5 g (1 part by weight) |
| Organic solvent | 746.7 g |
| Aqueous solution of acetic acid | 6.9 g |
| Photo polymerization initiator | 4.9 g |

Recipe of the Coating Solution for Forming the Low Refractive Index Layer:

| | |
|---|---|
| (a) 60-nm HSS | 14.0 g (50 parts by weight) |
| (b) GPTMS | 8.4 g (30 parts by weight) |
| (c) ZDBB(EAA) | 5.6 g (20 parts by weight) |
| Organic solvent | 970.1 g |
| Aqueous solution of acetic acid | 1.9 g |

The above transparent resin substrate for insert forming was evaluated for its properties in the same manner as in Example 1 to obtain the results as shown in Table 3.

Example 9

A transparent resin substrate for insert forming was prepared in the same manner as in Example 1 but changing the recipe of the coating solution for forming the hard coating and the recipe of the coating solution for forming the low refractive index layer (see Table 1). The hard coating that was formed possessed a refractive index of 1.49 and the low refractive index layer possessed a refractive index of 1.4.

Recipe of the Coating Solution for Forming the Hard Coating:

| | |
|---|---|
| (A1) AfOI2FA | 90.0 g (60 parts by weight) |
| (A2) AfOI4FA | 60.0 g (40 parts by weight) |
| (B) APTMS | 30.0 g (20 parts by weight) |
| (C) 12-nm SSS | 60.0 g (40 parts by weight) |
| (D) AAAADI | 1.5 g (1 part by weight) |
| Organic solvent | 746.7 g |
| Aqueous solution of acetic acid | 6.9 g |
| Photo polymerization initiator | 4.9 g |

Recipe of the Coating Solution for Forming the Low Refractive Index Layer:

| | |
|---|---|
| (a) 50-nm HSS | 14.0 g (50 parts by weight) |
| (b) APTMS | 8.4 g (30 parts by weight) |
| (c) AAAADI | 5.6 g (20 parts by weight) |
| Organic solvent | 970.1 g |
| Aqueous solution of acetic acid | 1.9 g |

The above transparent resin substrate for insert forming was evaluated for its properties in the same manner as in Example 1 to obtain the results as shown in Table 3.

Comparative Example 1

A transparent resin substrate for insert forming was prepared in the same manner as in Example 1 but using 150 g of the AfOI4FA (A2) only and using no AfOI2FA (A1) in preparing the coating solution for forming the hard coating (see Table 2). Namely, in the composition of the hard coating, the ratio A1/A2 was 0/100. The hard coating that was formed possessed a refractive index of 1.49. The transparent resin substrate for insert forming was evaluated for its properties in the same manner as in Example 1 to obtain the results as shown in Table 3.

Comparative Example 2

A transparent resin substrate for insert forming was prepared in the same manner as in Example 2 but using 120 g of the AfOI2FA (A1), 30 g of the AfOI4FA (A2), 10-nm SSS (C) and using no 12-nm SSS in preparing the coating solution for forming the hard coating (see Table 2). Namely, in the composition of the hard coating, the ratio A1/A2 was 80/20, and the amount of the solid silica sol (C) was 40 parts by weight. The hard coating that was formed possessed a refractive index of 1.49. The transparent resin substrate for insert forming was evaluated for its properties in the same manner as in Example 2 to obtain the results as shown in Table 3.

Comparative Example 3

A transparent resin substrate for insert forming was prepared in the same manner as in Example 4 without, however, using the GPTMS (B) in preparing the coating solution for forming the hard coating (see Table 2). The hard coating that was formed possessed a refractive index of 1.49. The transparent resin substrate for insert forming was evaluated for its properties in the same manner as in Example 4 to obtain the results as shown in Table 3.

Comparative Example 4

A transparent resin substrate for insert forming was prepared in the same manner as in Example 4 but using 60 g (i.e., 40 parts by weight) of the GPTMS (B) in preparing the coating solution for forming the hard coating (see Table 2). The hard coating that was formed possessed a refractive index of 1.49. The transparent resin substrate for insert forming was evaluated for its properties in the same manner as in Example 4 to obtain the results as shown in Table 3.

Comparative Example 5

A transparent resin substrate for insert forming was prepared in the same manner as in Example 3 but using no 10-nm SSS (C) in preparing the coating solution for forming the hard coating (see Table 2). The hard coating that was formed possessed a refractive index of 1.5. The transparent resin substrate for insert forming was evaluated for its properties in the same manner as in Example 3 to obtain the results as shown in Table 3.

Comparative Example 6

A transparent resin substrate for insert forming was prepared in the same manner as in Example 3 but using 82.5 g (i.e., 55 parts by weight) of the 10-nm SSS (C) in preparing the coating solution for forming the hard coating (see Table 2). The hard coating that was formed possessed a refractive index of 1.49. The transparent resin substrate for insert forming was evaluated for its properties in the same manner as in Example 3 to obtain the results as shown in Table 3.

Comparative Example 7

A transparent resin substrate for insert forming was prepared in the same manner as in Example 6 but using no ZDBB (EAA) (D) in preparing the coating solution for forming the hard coating (see Table 2). The hard coating that was formed possessed a refractive index of 1.49. The transparent resin substrate for insert forming was evaluated for its properties in the same manner as in Example 6 to obtain the results as shown in Table 3.

Comparative Example 8

A transparent resin substrate for insert forming was prepared in the same manner as in Example 2 but using 15.4 g of the 50-nm HSS (a) and 7 g of the APTMS (b) (see Table 2). Namely, in the composition of the low refractive index layer, the amount of the low refractive index hollow silica sol (a) was 55 parts by weight and the amount of the hydrolyzed product (b) of the silane coupling agent was 25 parts by weight. The hard coating that was formed possessed a refractive index of 1.39. The transparent resin substrate for insert forming was evaluated for its properties in the same manner as in Example 2 to obtain the results as shown in Table 3.

Comparative Example 9

A transparent resin substrate for insert forming was prepared in the same manner as in Example 2 but using 1.4 g of the 50-nm HSS (a), 26.6 g of the APTMS (b) and using no AAAADI (c) (see Table 2). Namely, in the composition of the low refractive index layer, the amount of the low refractive index hollow silica sol (a) was 5 parts by weight and the amount of the hydrolyzed product (b) of the silane coupling agent was 95 parts by weight. The hard coating that was formed possessed a refractive index of 1.47. The transparent resin substrate for insert forming was evaluated for its properties in the same manner as in Example 2 to obtain the results as shown in Table 3.

Comparative Example 10

The coating solution for forming the hard coating was prepared according to the following recipe (see Table 4). Parentheses show the composition per 100 parts by weight of the urethane acrylate (A).

The methylisobutyl ketone was used as the organic solvent. The amount of the organic solvent in the following recipe was inclusive of the amount of the isopropanol in the dispersion medium used for the silica sol.

The above solution for forming the hard coating was applied onto the surface of the same underlying sheet 1 as the one used in Example 1, and was heated and irradiated with ultraviolet ray to form a hard coating of a thickness of 2 μm.

Recipe of the Coating Solution for Forming the Hard Coating:

| | |
|---|---|
| (A1) AfOI2FA | 45.0 g (30 parts by weight) |
| (A2) AfOI6FA | 105.0 g (70 parts by weight) |
| (B) GPTMS | 30.0 g (20 parts by weight) |
| (C) 10-nm SSS | 60.0 g (40 parts by weight) |
| (D) ZDBB(EAA) | 1.5 g (1 part by weight) |
| Organic solvent | 746.7 g |
| Aqueous solution of acetic acid | 6.9 g |
| Photo polymerization initiator | 4.9 g |

The coating solution for forming the intermediate refractive index layer was prepared according to the following recipe (see Table 4). Parentheses show the composition of the intermediate refractive index layer.

The methylisobutyl ketone was used as the organic solvent. The amount of the organic solvent in the following recipe was inclusive of the amount of the isopropanol in the dispersion medium used for the zirconia sol.

The above coating solution was applied onto the surface of the above hard coating, and was heated to form the intermediate refractive index layer having a thickness of 85 nm and a refractive index of 1.62.

| | |
|---|---|
| Zirconia sol (metal oxide sol) (refractive index, 1.9) | 15.0 g (30 parts by weight) |
| Hydrolyzed product of GPTMS (silane coupling agent) | 33.5 g (67 parts by weight) |
| ZDBB(EAA) (metal chelate compound) | 1.5 g (3 parts by weight) |
| Organic solvent | 942.4 g |
| Aqueous solution of acetic acid | 7.6 g |

The coating solution for forming the high refractive index layer was prepared according to the following recipe (see Table 4). Parentheses show the composition of the high refractive index layer.

The isopropanol was used as the organic solvent. The amount of the organic solvent in the following recipe was inclusive of the amount of the methylisobutyl ketone in the dispersion medium used for the titanium oxide sol.

The above coating solution was applied onto the surface of the above intermediate refractive index layer, and was heated to form the high refractive index layer having a thickness of 80 nm and a refractive index of 1.73.

| | |
|---|---|
| Titanium oxide sol (metal oxide sol) (refractive index, 1.98) | 28.9 g (85 parts by weight) |
| Hydrolyzed product of GPTMS (silane coupling agent) | 5.1 g (15 parts by weight) |
| ZDBB(EAA) (metal chelate compound) | 1.02 g (3 parts by weight) |
| Organic solvent | 963.78 g |
| Aqueous solution of acetic acid | 1.2 g |

The coating solution for forming the low refractive index layer was prepared according to the following recipe (see Table 4). Parentheses show the composition of the low refractive index layer.

The amount of the organic solvent in the following recipe was inclusive of the amount of the isopropanol in the dispersion medium used for the silica sol.

The above coating solution was applied onto the hard coating, and was heated to form the low refractive index layer having a thickness of 100 nm and a refractive index of 1.38 to thereby obtain a transparent resin substrate for insert forming.

| (a) 60-nm HSS | 14.0 g (50 parts by weight) |
|---|---|
| (b) GPTMS | 8.4 g (30 parts by weight) |
| (c) ZDBB(EAA) | 5.6 g (20 parts by weight) |
| Organic solvent | 970.1 g |
| Aqueous solution of acetic acid | 1.9 g |

The transparent resin substrate for insert forming was evaluated for its properties in the same manner as in Example 1 except the scratch resistance to obtain the results as shown in Table 5.

The scratch resistance was tested by moving the steel wool round trip 150 times.

Example 11

A transparent resin substrate for insert forming was prepared in the same manner as in Example 10 but changing the recipe of the coating solution for forming the hard coating, the recipe of the coating solution for forming the intermediate refractive index layer, the recipe of the coating solution for forming the high refractive index layer and the recipe of the coating solution for forming the low refractive index layer. The hard coating possessed a refractive index of 1.49, the intermediate refractive index layer possessed a refractive index of 1.62, the high refractive index layer possessed a refractive index of 1.65 and the low refractive index layer possessed a refractive index of 1.38.

Recipe of the Coating Solution for Forming the Hard Coating:

| (A1) AfOI2FA | 45.0 g (30 parts by weight) |
|---|---|
| (A2) AfOI6FA | 105.0 g (70 parts by weight) |
| (B) APTMS | 30.0 g (20 parts by weight) |
| (C) 12-nm SSS | 60.0 g (40 parts by weight) |
| (D) AAAADI | 1.5 g (1 part by weight) |
| Organic solvent | 746.7 g |
| Aqueous solution of acetic acid | 6.9 g |
| Photo polymerization initiator | 4.9 g |

Recipe of the Coating Solution for Forming the Intermediate Refractive Index Layer:

| Zirconia sol (metal oxide sol) | 15.0 g (30 parts by weight) |
|---|---|
| Hydrolyzed product of APTMS (silane coupling agent) | 33.5 g (67 parts by weight) |
| AAAADI (metal chelate compound) | 1.5 g (3 parts by weight) |
| Organic solvent | 942.4 g |
| Aqueous solution of acetic acid | 7.6 g |

Recipe of the Coating Solution for Forming the High Refractive Index Layer:

| Zirconia sol (metal oxide sol) (refractive index, 1.9) | 18.7 g (55 parts by weight) |
|---|---|
| Hydrolyzed product of APTMS (silane coupling agent) | 15.3 g (45 parts by weight) |
| AAAADI (metal chelate compound) | 1.02 g (3 parts by weight) |
| Organic solvent | 961.38 g |
| Aqueous solution of acetic acid | 3.6 g |

Recipe of the Coating Solution for Forming the Low Refractive Index Layer:

| (a) 60-nm HSS | 14.0 g (50 parts by weight) |
|---|---|
| (b) APTMS | 8.4 g (30 parts by weight) |
| (c) AAAADI | 5.6 g (20 parts by weight) |
| Organic solvent | 970.1 g |
| Aqueous solution of acetic acid | 1.9 g |

The above transparent resin substrate for insert forming was evaluated for its properties in the same manner as in Example 10 to obtain the results as shown in Table 5.

Example 12

A transparent resin substrate for insert forming was prepared in the same manner as in Example 10 but changing the recipe of the coating solution for forming the hard coating, the recipe of the coating solution for forming the intermediate refractive index layer, the recipe of the coating solution for forming the high refractive index layer and the recipe of the coating solution for forming the low refractive index layer. The hard coating possessed a refractive index of 1.49, the intermediate refractive index layer possessed a refractive index of 1.64, the high refractive index layer possessed a refractive index of 1.73 and the low refractive index layer possessed a refractive index of 1.38.

Recipe of the Coating Solution for Forming the Hard Coating:

| (A1) AfOI2FA | 45.0 g (30 parts by weight) |
|---|---|
| (A2) AfOI6FA | 105.0 g (70 parts by weight) |
| (B) (ECH)ETMS | 30.0 g (20 parts by weight) |
| (C) 12-nm SSS | 60.0 g (40 parts by weight) |
| (D) ATAA | 1.5 g (1 part by weight) |
| Organic solvent | 746.7 g |
| Aqueous solution of acetic acid | 6.9 g |
| Photo polymerization initiator | 4.9 g |

Recipe of the Coating Solution for Forming the Intermediate Refractive Index Layer:

| Titanium oxide sol (metal oxide sol) | 15.0 g (30 parts by weight) |
|---|---|
| Hydrolyzed product of (ECH)ETMS (silane coupling agent) | 33.5 g (67 parts by weight) |
| ATAA (metal chelate compound) | 1.5 g (3 parts by weight) |
| Organic solvent | 942.4 g |
| Aqueous solution of acetic acid | 7.6 g |

Recipe of the Coating Solution for Forming the High Refractive Index Layer:

| Titanium oxide sol (metal oxide sol) | 28.9 g (85 parts by weight) |
|---|---|
| (ECH)ETMS (silane coupling agent) | 5.1 g (15 parts by weight) |
| ATAA (metal chelate compound) | 1.02 g (3 parts by weight) |
| Organic solvent | 963.78 g |
| Aqueous solution of acetic acid | 1.2 g |

Recipe of the Coating Solution for Forming the Low Refractive Index Layer:

| (a) 60-nm HSS | 14.0 g (50 parts by weight) |
|---|---|
| (b) (ECH)ETMS | 8.4 g (30 parts by weight) |
| (c) ATAA | 5.6 g (20 parts by weight) |
| Organic solvent | 970.1 g |
| Aqueous solution of acetic acid | 1.9 g |

The above transparent resin substrate for insert forming was evaluated for its properties in the same manner as in Example 10 to obtain the results as shown in Table 5.

TABLE 1

|  |  | Example 1 | | Example 2 | | Example 3 | | Example 4 | | Example 5 | |
|---|---|---|---|---|---|---|---|---|---|---|---|
| *1 | *2 | ○ | | ○ | | ○ | | ○ | | ○ | |
| Hard coating, 2 μm thick | | *3 | *4 | *3 | *4 | *3 | *4 | *3 | *4 | *3 | *4 |
| A1 | AfOI2FA | 7.50 | 5.0 | 105.00 | 70.0 | 45.00 | 30.0 | | | | |
|  | AcOI3FA | | | | | | | 45.00 | 30.0 | 45.00 | 30.0 |
| A2 | AfOI4FA | 142.50 | 95.0 | 45.00 | 30.0 | 105.00 | 70.0 | | | | |
|  | AcOI4FA | | | | | | | 105.00 | 70.0 | 105.00 | 70.0 |
|  | AfOI6FA | | | | | | | | | | |
|  |  | | 100.0 | | 100.0 | | 100.0 | | 100.0 | | 100.0 |
| B | GPTMS | 30.00 | 20.0 | | | 37.50 | 25.0 | 1.50 | 1.0 | 37.50 | 25.0 |
|  | APTMS | | | 30.00 | 20.0 | | | | | | |
|  | (ECH)ETMS | | | | | | | | | | |
| C | 10-nm SSS (*5) | 60.00 | 40.0 | | | 1.50 | 1.0 | 67.50 | 45.0 | 67.50 | 45.0 |
|  | 12-nm SSS (*5) | | | 60.00 | 40.0 | | | | | | |
| D | ZDBB(EAA) | 1.50 | 1.0 | | | | | | | | |
|  | AAAADI | | | 1.50 | 1.0 | | | | | | |
|  | ATAA | | | | | 1.50 | 1.0 | | | | |
|  | ZTAA | | | | | | | 1.50 | 1.0 | 1.50 | 1.0 |
|  | Org. solvent | 746.70 | | 746.70 | | 796.00 | | 774.20 | | 730.00 | |
|  | *6 | 6.90 | | 6.90 | | 8.60 | | 0.40 | | 8.60 | |
|  | *7 | 4.90 | | 4.90 | | 4.90 | | 4.90 | | 4.90 | |
|  |  | 1000.00 | 161.0 | 1000.00 | 161.0 | 1000.00 | 127.0 | 1000.00 | 147.0 | 1000.00 | 171.0 |

*1: Substrate,
*2: PMMA, glass trans. point (Tg) 106° C.,
*3: Amount (g),
*4: Solid component (pts),
(*5): 20 wt % solid comp. dispersed in IPA
*6: Acetic acid aq. sol.,
*7: Photo polymerization initiator

|  |  | Example 1 | | Example 2 | | Example 3 | | Example 4 | | Example 5 | |
|---|---|---|---|---|---|---|---|---|---|---|---|
| Low refractive index layer, 100 nm thick | | *1 | *2 | *1 | *2 | *1 | *2 | *1 | *2 | *1 | *2 |
| a | 60-nmHSS (*3) | 14.00 | 50.0 | | | 14.00 | 50.0 | | | 14.00 | 50.0 |
|  | 50-nmHSS (*3) | | | 14.00 | 50.0 | | | 14.00 | 50.0 | | |
| b | GPTMS | 8.40 | 30.0 | | | 13.86 | 49.5 | 13.86 | 49.5 | 13.86 | 49.5 |
|  | APTMS | | | 8.40 | 30.0 | | | | | | |
|  | (ECH)ETMS | | | | | | | | | | |
| c | ZDBB(EAA) | 5.60 | 20.0 | | | | | | | | |
|  | AAAADI | | | 5.60 | 20.0 | | | | | | |
|  | ATAA | | | | | 0.14 | 0.5 | | | | |
|  | ZTAA | | | | | | | 0.14 | 0.5 | 0.14 | 0.5 |
|  | Org. solvent | 970.10 | | 970.10 | | 968.80 | | 968.80 | | 968.80 | |
|  | Acetic acid aq. sol. | 1.90 | | 1.90 | | 3.20 | | 3.20 | | 3.20 | |
|  |  | 1000.00 | 100.0 | 1000.00 | 100.0 | 1000.00 | 100.0 | 1000.00 | 100.0 | 1000.00 | 100.0 |

*1: Amount (g),
*2: Solid component (pts)
(*3): 20 wt % solid comp. dispersed in IPA

|  |  | Example 6 | | Example 7 | | Example 8 | | Example 9 | |
|---|---|---|---|---|---|---|---|---|---|
| *1 | *2 | ○ | | ○ | | ○ | | ○ | |
| Hard coating, 2 μm thick | | *3 | *4 | *3 | *4 | *3 | *4 | *3 | *4 |
| A1 | AfOI2FA | 45.00 | 30.0 | 45.00 | 30.0 | 15.00 | 10.0 | 90.00 | 60.0 |
|  | AcOI3FA | | | | | | | | |
| A2 | AfOI4FA | | | | | 135.00 | 90.0 | 60.00 | 40.0 |
|  | AcOI4FA | | | | | | | | |
|  | AfOI6FA | 105.00 | 70.0 | 105.00 | 70.0 | | | | |
|  |  | | 100.0 | | 100.0 | | 100.0 | | 100.0 |
| B | GPTMS | | | 30.00 | 20.0 | 30.00 | 20.0 | | |
|  | APTMS | | | | | | | 30.00 | 20.0 |
|  | (ECH)ETMS | 30.00 | 20.0 | | | | | | |
| C | 10-nm SSS (*5) | 60.00 | 40.0 | | | 60.00 | 40.0 | 60.00 | 40.0 |
|  | 12-nm SSS (*5) | | | 60.00 | 40.0 | | | | |
| D | ZDBB(EAA) | 0.15 | 0.1 | 4.50 | 3.0 | 1.50 | 1.0 | | |
|  | AAAADI | | | | | | | 1.50 | 1.0 |
|  | ATAA | | | | | | | | |
|  | ZTAA | | | | | | | | |
|  | Org. solvent | 748.05 | | 743.70 | | 746.70 | | 746.70 | |

TABLE 1-continued

|  |  |  |  |  |  |  |  |  |
|---|---|---|---|---|---|---|---|---|
| *6 |  | 6.90 |  | 6.90 |  | 6.90 |  | 6.90 |
| *7 |  | 4.90 |  | 4.90 |  | 4.90 |  | 4.90 |
|  | 1000.00 | 160.1 | 1000.00 | 163.0 | 1000.00 | 161.0 | 1000.00 | 161.0 |

*1: Substrate,
*2: PMMA, glass trans. point (Tg) 106° C.,
*3: Amount (g),
*4: Solid component (pts),
(*5): 20 wt % solid comp. dispersed in IPA
*6: Acetic acid aq. sol.,
*7: Photo polymerization initiator

|  |  | Example 6 | | Example 7 | | Example 8 | | Example 9 | |
|---|---|---|---|---|---|---|---|---|---|
| Low refractive index layer, 100 nm thick | | *1 | *2 | *1 | *2 | *1 | *2 | *1 | *2 |
| a | 60-nmHSS (*3) | 2.80 | 10.0 |  |  | 14.00 | 50.0 |  |  |
|  | 50-nmHSS (*3) |  |  | 2.80 | 10.0 |  |  | 14.00 | 50.0 |
| b | GPTMS |  |  | 24.92 | 89.0 | 8.40 | 30.0 |  |  |
|  | APTMS |  |  |  |  |  |  | 8.40 | 30.0 |
|  | (ECH)ETMS | 15.40 | 55.0 |  |  |  |  |  |  |
| c | ZDBB(EAA) | 9.80 | 35.0 | 0.28 | 1.0 | 5.60 | 20.0 |  |  |
|  | AAAADI |  |  |  |  |  |  |  |  |
|  | ATAA |  |  |  |  |  |  |  |  |
|  | ZTAA |  |  |  |  |  |  | 5.60 | 20.0 |
|  | Org. solvent | 968.50 |  | 966.30 |  | 970.10 |  | 970.10 |  |
|  | Acetic acid aq. sol. | 3.50 |  | 5.70 |  | 1.90 |  | 1.90 |  |
|  |  | 1000.00 | 100.0 | 1000.00 | 100.0 | 1000.00 | 100.0 | 1000.00 | 100.0 |

*1: Amount (g),
*2: Solid component (pts)
(*3): 20 wt % solid comp. dispersed in IPA

TABLE 2

|  |  | Comp. Ex. 1 | | Comp. Ex. 2 | | Comp. Ex. 3 | | Comp. Ex. 4 | | Comp. Ex. 5 | |
|---|---|---|---|---|---|---|---|---|---|---|---|
| *1 | *2 | ○ | | ○ | | ○ | | ○ | | ○ | |
| Hard coating, 2 μm thick | | *3 | *4 | *3 | *4 | *3 | *4 | *3 | *4 | *3 | *4 |
| A1 | AfOI2FA |  | 0.0 |  |  |  |  | 45.00 | 30.0 | 45.00 | 30.0 |
|  | AcOI3FA |  |  | 45.00 | 30.0 | 45.00 | 30.0 |  |  |  |  |
| A2 | AfOI4FA | 150.00 | 100.0 |  |  |  |  | 105.00 | 70.0 | 105.00 | 70.0 |
|  | AcOI4FA |  |  | 105.00 | 70.0 | 105.00 | 70.0 |  |  |  |  |
|  | AfOI6FA |  |  |  |  |  |  |  |  |  |  |
|  |  |  | 100.0 |  | 100.0 |  | 100.0 |  | 100.0 |  | 100.0 |
| B | GPTMS | 30.00 | 20.0 |  | 0.0 | 60.00 | 40.0 | 37.50 | 25.0 | 37.50 | 25.0 |
|  | APTMS |  |  |  |  |  |  |  |  |  |  |
|  | (ECH)ETMS |  |  |  |  |  |  |  |  |  |  |
| C | 10-nm SSS (*5) | 60.00 | 40.0 | 67.50 | 45.0 | 67.50 | 45.0 |  | 0.0 | 82.50 | 55.0 |
|  | 12-nm SSS (*5) |  |  |  |  |  |  |  |  |  |  |
| D | ZDBB(EAA) | 1.50 | 1.0 |  |  |  |  |  |  |  |  |
|  | AAAADI |  |  |  |  |  |  |  |  |  |  |
|  | ATAA |  |  |  |  |  |  | 1.50 | 1.0 | 1.50 | 1.0 |
|  | ZTAA |  |  | 1.50 | 1.0 | 1.50 | 1.0 |  |  |  |  |
|  | Org. solvent | 746.70 |  | 776.10 |  | 702.30 |  | 797.50 |  | 715.00 |  |
|  | *6 | 6.90 |  | 0.00 |  | 13.80 |  | 8.60 |  | 8.60 |  |
|  | *7 | 4.90 |  | 4.90 |  | 4.90 |  | 4.90 |  | 4.90 |  |
|  |  | 1000.00 | 161.0 | 1000.00 | 146.0 | 1000.00 | 186.0 | 1000.00 | 126.0 | 1000.00 | 181.0 |

*1: Substrate,
*2: PMMA, glass trans. point (Tg) 106° C.,
*3: Amount (g),
*4: Solid component (pts),
(*5): 20 wt % solid comp. dispersed in IPA
*6: Acetic acid aq. sol.,
*7: Photo polymerization initiator

|  |  | Comp. Ex. 1 | | Comp. Ex. 2 | | Comp. Ex. 3 | | Comp. Ex. 4 | | Comp. Ex. 5 | |
|---|---|---|---|---|---|---|---|---|---|---|---|
| Low refractive index layer, 100 nm thick | | *1 | *2 | *1 | *2 | *1 | *2 | *1 | *2 | *1 | *2 |
| a | 60-nmHSS (*3) | 14.00 | 50.0 |  |  |  |  | 14.00 | 50.0 | 14.00 | 50.0 |
|  | 50-nmHSS (*3) |  |  | 14.00 | 50.0 | 14.00 | 50.0 |  |  |  |  |

TABLE 2-continued

| | | | | | | | | | | |
|---|---|---|---|---|---|---|---|---|---|---|
| b | GPTMS | 8.40 | 30.0 | 13.86 | 49.5 | 13.86 | 49.5 | 13.86 | 49.5 | 13.86 | 49.5 |
| | APTMS | | | | | | | | | | |
| | (ECH)ETMS | | | | | | | | | | |
| c | ZDBB(EAA) | 5.60 | 20.0 | | | | | | | | |
| | AAAADI | | | | | | | | | | |
| | ATAA | | | | | | | | 0.14 | 0.5 | 0.14 | 0.5 |
| | ZTAA | | | 0.14 | 0.5 | 0.14 | 0.5 | | | | |
| | Org. solvent | 970.10 | | 968.80 | | 968.80 | | 968.80 | | 968.80 | |
| | Acetic acid aq. sol. | 1.90 | | 3.20 | | 3.20 | | 3.20 | | 3.20 | |
| | | 1000.00 | 100.0 | 1000.00 | 100.0 | 1000.00 | 100.0 | 1000.00 | 100.0 | 1000.00 | 100.0 |

*1: Amount (g),
*2: Solid component (pts)
(*3): 20 wt % solid comp. dispersed in IPA

| | | Comp. Ex. 6 | | Comp. Ex. 7 | | Comp. Ex. 8 | |
|---|---|---|---|---|---|---|---|
| *1 | *2 | ○ | | ○ | | ○ | |
| Hard coating, 2 μm thick | | *3 | *4 | *3 | *4 | *3 | *4 |
| A1 | AfOI2FA | 45.00 | 30.0 | 105.00 | 70.0 | 105.00 | 70.0 |
| | AcOI3FA | | | | | | |
| A2 | AfOI4FA | | | 45.00 | 30.0 | 45.00 | 30.0 |
| | AcOI4FA | | | | | | |
| | AfOI6FA | 105.00 | 70.0 | | | | |
| | | | 100.0 | | 100.0 | | 100.0 |
| B | GPTMS | | | | | | |
| | APTMS | | | 30.00 | 20.0 | 30.00 | 20.0 |
| | (ECH)ETMS | 30.00 | 20.0 | | | | |
| C | 10-nm SSS (*5) | 60.00 | 40.0 | | | | |
| | 12-nm SSS (*5) | | | 60.00 | 40.0 | 60.00 | 40.0 |
| D | ZDBB(EAA) | | 0.0 | | | | |
| | AAAADI | | | 1.50 | 1.0 | 1.50 | 1.0 |
| | ATAA | | | | | | |
| | ZTAA | | | | | | |
| | Org. solvent | 748.20 | | 746.70 | | 746.70 | |
| | *6 | 6.90 | | 6.90 | | 6.90 | |
| | *7 | 4.90 | | 4.90 | | 4.90 | |
| | | 1000.00 | 160.0 | 1000.00 | 161.0 | 1000.00 | 161.0 |

*1: Substrate,
*2: PMMA, glass trans. point (Tg) 106° C.,
*3: Amount (g),
*4: Solid component (pts),
(*5): 20 wt % solid comp. dispersed in IPA
*6: Acetic acid aq. sol.,
*7: Photo polymerization initiator

| | | Comp. Ex. 6 | | Comp. Ex. 7 | | Comp. Ex. 8 | |
|---|---|---|---|---|---|---|---|
| Low refractive index layer, 100 nm thick | | *1 | *2 | *1 | *2 | *1 | *2 |
| a | 60-nmHSS (*3) | 2.80 | 10.0 | | | | |
| | 50-nmHSS (*3) | | | 15.40 | 55.0 | 1.40 | 5.0 |
| b | GPTMS | | | | | | |
| | APTMS | | | 7.00 | 25.0 | 26.60 | 95.0 |
| | (ECH)ETMS | 15.40 | 55.0 | | | | |
| c | ZDBB(EAA) | 9.80 | 35.0 | | | | |
| | AAAADI | | | 5.60 | 20.0 | | 0.0 |
| | ATAA | | | | | | |
| | ZTAA | | | | | | |
| | Org. solvent | 968.50 | | 970.40 | | 965.90 | |
| | Acetic acid aq. sol. | 3.50 | | 1.60 | | 6.10 | |
| | | 1000.00 | 100.0 | 1000.00 | 100.0 | 1000.00 | 100.0 |

*1: Amount (g),
*2: Solid component (pts)
(*3): 20 wt % solid comp. dispersed in IPA

TABLE 3

| | | Evaluation of properties | | | | | | |
|---|---|---|---|---|---|---|---|---|
| | | Total light trans. factor | Reflectivity | Elongation percentage | Hardness | Scratch resistance | Heat-shapability | Falling ball test |
| Ex. | 1 | 97.1% | 3.0% | 101.0% | 4H | ◎ | ○ | ○ |
| | 2 | 95.9% | 4.1% | 138.0% | 3H | Δ | ○ | ○ |
| | 3 | 96.9% | 3.1% | 130.0% | 3H | ○ | ○ | ○ |
| | 4 | 95.7% | 4.3% | 125.0% | 4H | ○ | ○ | ○ |
| | 5 | 96.9% | 3.1% | 125.0% | 4H | ○ | ○ | ○ |
| | 6 | 94.5% | 5.5% | 125.0% | 4H | ○ | ○ | ○ |
| | 7 | 94.2% | 5.8% | 125.0% | 4H | ○ | ○ | ○ |
| | 8 | 97.0% | 3.0% | 102.5% | 4H | ◎ | ○ | ○ |
| | 9 | 96.1% | 4.0% | 133.3% | 3H | ○ | ○ | ○ |
| Comp. Ex. | 1 | 97.1% | 3.0% | 100.5% | 4H | ◎ | X | X |
| | 2 | 95.7% | 4.3% | 125.0% | 4H | X | ○ | ○ |
| | 3 | 95.7% | 4.3% | 125.0% | 4H | ○ | ○ | ○ * |
| | 4 | 96.9% | 3.1% | 125.0% | 3H | X | ○ | ○ * |
| | 5 | 96.9% | 3.1% | 105.0% | 4H | ○ | X | ○ |
| | 6 | 94.5% | 5.5% | 125.0% | 4H | X | ○ | ○ |
| | 7 | 96.1% | 3.9% | 133.0% | 3H | X | X | ○ |
| | 8 | 94.0% | 6.0% | 133.0% | 3H | X | ○ | ○ |

* Poor appearance

TABLE 4

| | | Example 10 | | Example 11 | | Example 12 | |
|---|---|---|---|---|---|---|---|
| *1 | PMMA, glass trans. point (Tg) 106° C. | ○ | | ○ | | ○ | |
| Hard coating, 2 μm thick | | *2 | *3 | *2 | *3 | *2 | *3 |
| A1 | AfOI2FA | 45.00 | 30.0 | 45.00 | 30.0 | 45.00 | 30.0 |
| A2 | AfOI6FA | 105.00 | 70.0 | 105.00 | 70.0 | 105.00 | 70.0 |
| | | | 100.0 | | 100.0 | | 100.0 |
| B | GPTMS | 30.00 | 20.0 | | | | |
| | APTMS | | | 30.00 | 20.0 | | |
| | (ECH)ETMS | | | | | 30.00 | 20.0 |
| C | 10-nm SSS (20 wt % solid comp. dispersed in IPA) | 60.00 | 40.0 | | | | |
| | 12-nm SSS (20 wt % solid comp. dispersed in IPA) | | | 60.00 | 40.0 | 60.00 | 40.0 |
| D | ZDBB(EAA) | 1.50 | 1.0 | | | | |
| | AAAADI | | | 1.50 | 1.0 | | |
| | ATAA | | | | | 1.50 | 1.0 |
| | Org. solvent | 746.70 | | 746.70 | | 746.70 | |
| | Acetic acid aq. sol. | 6.90 | | 6.90 | | 6.90 | |
| | Photo polymerization initiator | 4.90 | | 4.90 | | 4.90 | |
| | | 1000.00 | 161.0 | 1000.00 | 161.0 | 1000.00 | 161.0 |

*1: Substrate,
*2: Amount (g),
*3: Solid component (pts)

| | Example 10 | | Example 11 | | Example 12 | |
|---|---|---|---|---|---|---|
| | *1 | *2 | *1 | *2 | *1 | *2 |
| Intermediate refractive index layer, 85 nm thick | | | | | | |
| Zirconia sol | 15.00 | 30.0 | 15.00 | 30.0 | | |
| Ti oxide sol (*3) | | | | | 15.00 | 30.0 |
| GPTMS | 33.50 | 67.0 | | | | |
| APTMS | | | 33.50 | 67.0 | | |
| (ECH)ETMS | | | | | 33.50 | 67.0 |
| ZDBB(EAA) | 1.50 | 3.0 | | | | |
| AAAADI | | | 1.50 | 3.0 | | |
| ATAA | | | | | 1.50 | 3.0 |

TABLE 4-continued

|  | | | | | | |
|---|---|---|---|---|---|---|
| Org. solvent | 942.40 | | 942.40 | | 942.40 | |
| Acetic acid aq. sol. | 7.60 | | 7.60 | | 7.60 | |
| | 1000.00 *1 | 100.0 *2 | 1000.00 *1 | 100.0 *2 | 1000.00 *1 | 100.0 *2 |
| High refractive index layer, 80 nm thick | | | | | | |
| Zirconia sol | | | 18.70 | 55.0 | | |
| Ti oxide sol (*3) | 28.90 | 85.0 | | | 28.90 | 85.0 |
| GPTMS | 5.10 | 15.0 | | | | |
| APTMS | | | 15.30 | 45.0 | | |
| (ECH)ETMS | | | | | 5.10 | 15.0 |
| ZDBB(EAA) | 1.02 | 3.0 | | | | |
| AAAADI | | | 1.02 | 3.0 | | |
| ATAA | | | | | 1.02 | 3.0 |
| Org. solvent | 963.78 | | 961.38 | | 963.78 | |
| Acetic acid aq. sol. | 1.20 | | 3.60 | | 1.20 | |
| | 1000.00 *1 | 103.0 *2 | 1000.00 *1 | 103.0 *2 | 1000.00 *1 | 103.0 *2 |
| Low refractive index layer, 100 nm thick | | | | | | |
| a  60-nm HSS (20 wt % solid comp. dispersed in IPA) | 14.00 | 50.0 | 14.00 | 50.0 | 14.00 | 50.0 |
| b  GPTMS | 8.40 | 30.0 | | | | |
| APTMS | | | 8.40 | 30.0 | | |
| (ECH)ETMS | | | | | 8.40 | 30.0 |
| c  ZDBB(EAA) | 5.60 | 20.0 | | | | |
| AAAADI | | | 5.60 | 20.0 | | |
| ATAA | | | | | 5.60 | 20.0 |
| Org. solvent | 970.10 | | 970.10 | | 970.10 | |
| Acetic acid aq. sol. | 1.90 | | 1.90 | | 1.90 | |
| | 1000.00 | 100.0 | 1000.00 | 100.0 | 1000.00 | 100.0 |

*1: Amount (g),
*2: Solid component (pts)
(*3): 20 wt % solid comp. dispersed in MIBK

TABLE 5

| | | Properties | | | | | |
|---|---|---|---|---|---|---|---|
| | | Total light trans. Factor | Reflectivity | Elongation percentage | Hardness | Scratch resistance | Heat-shapability |
| Ex. | 10 | 99.2% | 0.8% | 116.7% | 4H | ○ | ○ |
| | 11 | 98.5% | 1.5% | 116.7% | 4H | ○ | ○ |
| | 12 | 99.4% | 0.6% | 116.7% | 4H | ○ | ○ |

DESCRIPTION OF REFERENCE NUMERALS

1: Underlying sheet
3: Hard coating
5: low refractive index layer
7: High refractive index layer
9: Intermediate refractive index layer
10: antireflection film

The invention claimed is:

1. A transparent resin substrate having a light-transmitting thermoplastic resin underlying sheet and a hard coating formed on one surface of the underlying sheet, wherein,
   said hard coating comprises:
      100 parts by weight of a resin component (A) obtained by curing an urethane acrylate that contains a tri-functional or less functional urethane acrylate (A1) and a tetra-functional or more functional urethane acrylate (A2); 1 to 30 parts by weight of a compound (B) represented by the following general formula (1), $$R_n\text{—}Si(OR_1)_{4-n} \quad (1)$$

wherein R is an alkyl group or an alkenyl group, $R_1$ is an alkyl group, an alkoxyalkyl group, an acyloxy group or a halogen atom, and n is a number of 1 or 2, or a hydrolyzed product thereof;
      1 to 50 parts by weight of a silica sol (C) having a grain size of 5 to 500 nm and a refractive index in a range of 1.44 to 1.5; and
      0.1 to 3 parts by weight of a metal chelate compound (D); and wherein,
   a low refractive index layer is formed on said hard coating, said low refractive index layer comprising a low refractive index hollow silica sol (a) having a grain size of 10 to 150 nm and a refractive index of not more than 1.44, the compound (b) represented by the above general formula (1) or a hydrolyzed product thereof, and a metal chelate compound (c);
   said low refractive index layer containing said hollow silica sol (a) in an amount of 10 to 50% by weight, and containing said compound (b) or the hydrolyzed product thereof and said metal chelate compound (c) at a weight ratio (b/c) of 60/40 to 99/1.

2. The transparent resin substrate according to claim 1, wherein said transparent resin underlying sheet comprises an acrylic resin, a polycarbonate resin or a polyethylene terephthalate resin in the surface thereof on the side where said hard coating is formed.

3. The transparent resin substrate according to claim 1, wherein said transparent resin underlying sheet has a thickness of 30 to 1000 μm, said hard coating has a thickness of 0.5 to 10 μm, and said low refractive index layer has a thickness of 50 to 200 nm.

4. The transparent resin substrate according to claim 1, wherein the urethane acrylate in the resin component (A) of said hard coating contains the tri-functional or less functional urethane acrylate (A1) and the tetra-functional or more functional urethane acrylate (A2) at a weight ratio (A1/A2) of 2/98 to 70/30.

5. The transparent resin substrate according to claim 1, wherein an antireflection film of a multi-layer structure is formed on said hard coating, and the uppermost layer of said antireflection film is said low refractive index layer.

6. The transparent resin substrate according to claim 1, that is favorably used for insert forming.

* * * * *